United States Patent
Shin

(10) Patent No.: US 9,811,887 B2
(45) Date of Patent: Nov. 7, 2017

(54) APPARATUS AND METHOD FOR IMAGE STABILIZATION USING IMAGE BLUR CORRECTION

(71) Applicant: SK TELECOM CO., LTD., Seoul (KR)

(72) Inventor: Seungho Shin, Incheon (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/069,212

(22) Filed: Mar. 14, 2016

(65) Prior Publication Data

US 2016/0196639 A1 Jul. 7, 2016

Related U.S. Application Data

(63) Continuation of application No. PCT/KR2014/008564, filed on Sep. 15, 2014.

(30) Foreign Application Priority Data

Sep. 16, 2013 (KR) .................. 10-2013-0111366

(51) Int. Cl.
*G06T 5/00* (2006.01)
*H04N 5/232* (2006.01)
(Continued)

(52) U.S. Cl.
CPC ............ *G06T 5/003* (2013.01); *G06K 9/4609* (2013.01); *G06K 9/4652* (2013.01);
(Continued)

(58) Field of Classification Search
CPC ......... G06T 5/003; G06T 5/40; G06K 9/4609; G06K 9/6202
(Continued)

(56) References Cited

U.S. PATENT DOCUMENTS

| 8,508,599 B2* | 8/2013 | Miyasako | .......... G06K 9/00261 348/208.1 |
| 2006/0153472 A1* | 7/2006 | Sakata | ............... H04N 5/23248 382/255 |

FOREIGN PATENT DOCUMENTS

| JP | 2006-222933 | 8/2006 |
| JP | 2007-151008 | 6/2007 |

(Continued)

OTHER PUBLICATIONS

Oshima, An English machine translation of JP2009-290588, 2009.*
International Search Report dated Dec. 12, 2014 for PCT/KR2014/008564.

*Primary Examiner* — Ruiping Li
(74) *Attorney, Agent, or Firm* — Hauptman Ham, LLP

(57) ABSTRACT

An apparatus for stabilizing an image includes: an image analyzing unit analyzing characteristics of each block to calculate a weight of each block; a significant block extracting unit extracting, from the blocks, a block having a weight larger than a threshold value, as a significant block; a feature point extracting unit extracting a feature point from the significant block by extracting pixels of the significant block and comparing at least one of color and brightness between the pixels and neighboring pixels of the pixels; a local motion vector calculating unit calculating local motion vectors of blocks corresponding to the feature point by referring a previous frame of the frame and estimating a motion of the at least one block; a global motion vector calculating unit calculating a global motion vector based on the calculated at least one local motion vector.

16 Claims, 5 Drawing Sheets

(51) Int. Cl.
    *G06K 9/46*     (2006.01)
    *G06K 9/62*     (2006.01)
    *G06T 5/40*     (2006.01)
    *G06T 7/20*     (2017.01)
    *G06T 7/238*    (2017.01)
    *G06T 7/246*    (2017.01)

(52) U.S. Cl.
    CPC ......... *G06K 9/4661* (2013.01); *G06K 9/6202* (2013.01); *G06T 5/40* (2013.01); *G06T 7/20* (2013.01); *G06T 7/238* (2017.01); *G06T 7/246* (2017.01); *H04N 5/23254* (2013.01); *H04N 5/23267* (2013.01); *G06T 2207/10024* (2013.01); *G06T 2207/20021* (2013.01); *G06T 2207/20201* (2013.01)

(58) Field of Classification Search
    USPC ......................................................... 382/201
    See application file for complete search history.

(56) References Cited

FOREIGN PATENT DOCUMENTS

| | | |
|---|---|---|
| JP | 2009-088628 A | 4/2009 |
| JP | 2009-290588 A | 12/2009 |
| KR | 10-2010-0133826 A | 12/2010 |

* cited by examiner

APPARATUS AND METHOD FOR IMAGE STABILIZATION USING IMAGE BLUR CORRECTION

CROSS-REFERENCE TO RELATED APPLICATIONS

The present application is a continuation of International Patent Application No. PCT/KR2014/008564, filed Sep. 15, 2014, which claims priority to and benefit of Korean Patent Application No. 10-2013-0111366, filed on Sep. 16, 2013. The disclosures of the above-listed applications are hereby incorporated by reference herein in their entirety.

TECHNICAL FIELD

The present disclosure in some embodiments relates to a method and an apparatus for stabilizing an image based on an image blur correction.

BACKGROUND

The statements in this section merely provide background information related to the present disclosure and do not necessarily constitute prior art.

An imaging device has been increasingly used with the development of a camera imaging technology, which raises an issue of correcting an image blur. The image blur is generated from various environments, e.g., when using a camera of a mobile terminal device such as a portable digital camera, a smartphone, and the like, due to a camera shake or the like. In case of an outdoor-installed CCTV, the image blur is generated from a weather environment such as rain, wind, and the like, and an in-vehicle black box camera suffers from the image blur generated from a vibration of the vehicle during driving.

The inventor(s) has noted that an image stabilization means for correcting the image blur needs an apparatus or a program for correcting a blurry portion of a recorded image in a simple and accurate manner. The inventor(s) has noted that the image stabilization means employs a camera sensor for sensing and correcting a shake in order to correct a blurry image generated due to the limitation of an image correcting apparatus. The inventor(s) has noted that the camera sensor causes an increase in the cost and a limit in the downsizing.

The inventor(s) has noted that a method to overcome the increase in the cost of the sensor and the limit in miniaturizing thereof includes sensing an image blur by using the camera sensor, analyzing a level of the image blur, and correcting the blur by changing a direction of light by using a circuit of a camera lens. The inventor(s) has noted that this method corrects the blur by correcting a position of an image by using the camera sensor, However, The inventor(s) has experienced that the performance varies and the cost increases depending on the type of the camera sensor.

SUMMARY

According to some embodiments of the present disclosure, an apparatus for stabilizing an image based on a correction of a blur of the image. The apparatus includes: an image receiving unit configured to receive the image, a block dividing unit configured to divide a frame of the image into blocks; an image analyzing unit configured to analyze characteristics of each block to calculate a weight of each block; a significant block extracting unit configured to extract, from the blocks; a block having a weight equal to or larger than a threshold value, determine the extracted block to be a significant block; a feature point extracting unit configured to extract a feature point from the significant block by extracting pixels of the significant block and comparing at least one of color and brightness between the pixels and neighboring pixels of the pixels; a local motion vector calculating unit configured to calculate at least one local motion vector of at least one block corresponding to the feature point by referring a previous frame of the frame and estimating a motion of the at least one block; a global motion vector calculating unit configured to calculate a global motion vector based on the calculated at least one local motion vector of the at least one block, and an image correcting unit configured to correct output data of the frame based on the global motion vector.

According to some embodiments of the present disclosure, a method for stabilizing an image based on a correction of a blur of the image, the method, performed by a processor or ASIC, includes receiving the image; dividing a frame of the image into blocks; analyzing characteristics of each block to calculate a weight of each block; first extracting including extracting a block having a weight equal to or larger than a threshold value and determining the extracted block to be a significant block; extracting a feature point from the significant block by extracting pixels of the significant block and comparing at least one of color and brightness between the pixels and neighboring pixels of the pixels; calculating at least one local motion vector of at least one block corresponding to the feature point by referring a previous frame of the frame and estimating a motion of the at least one block; calculating a global motion vector based on at least one calculated local motion vector of the at least one block; and correcting output data of the frame based on the global motion vector.

DETAILED DESCRIPTION

Figure 1:
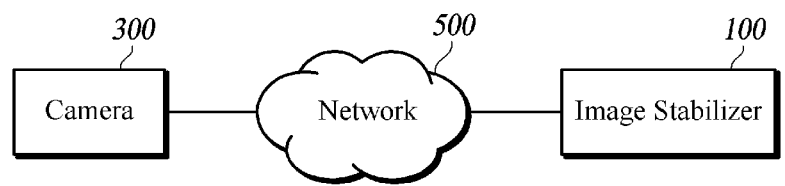
FIG. 1 is a block diagram of a system including an image stabilizing apparatus according to some embodiments of the present disclosure.

Hereinafter, at least one embodiment of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, in describing the components of the present disclosure, there are terms used like first, second, A, B, (a), and (b). These are solely for the purpose of differentiating one component from the other but not to imply or suggest the substances, order or sequence of the components. If a component were described as 'connected', 'coupled', or 'linked' to another component, they mean the components are not only directly 'connected', 'coupled', or 'linked' but also are indirectly 'connected', 'coupled', or 'linked' via a third component. The terms, such as "first" and "second," are used to describe various elements. The terms are merely used to distinguish one element from other elements, but are not used to limit the elements. Throughout the drawings, like numerals refer to portions that perform similar functions and exert similar effects, and duplicate descriptions of the portions will be omitted.

Some embodiments of the present disclosure provide a method and an apparatus for stabilizing an image based on an image blur correction with which a stabilized image is outputted by dividing an image recorded by a camera into one or more blocks to extract feature points from the divided blocks and correcting the image blur by calculating a motion vector(s) based on the feature points. The present disclosure is broadly useful for application in the fields of image correction and image stabilization by implementing the kind of process centered on user convenience and accessibility for achieving image corrections.

An overall system is described first referring to FIG. 1, including an image stabilizing apparatus 100 according to some embodiments of the present disclosure.

The image stabilizing apparatus 100 is connected via a wired or wireless network 500 to a camera 300 for capturing or recording an image. Each of the image stabilizing apparatus 100 and the camera 300 includes a communication module (or a communication modem) to transmit and receive communication signals (and/or image data) through the wired or wireless network 500. Herein, the wired or wireless network 500 includes the Internet, cloud computing networks, wireless personal area network (WPAN), wireless local area network (WLAN), WiBro (wireless broadband, aka WiMax) network, mobile communication network such as cellular, Wi-Fi, LAN, WAN, CDMA, WCDMA, GSM, LTE and EPC networks and the like or through various communication interfaces such as a cable, a universal serial bus (USB) and the like. Each of the image stabilizing apparatus 100 and the camera 300 is implemented by, or includes, one or more processors and/or application-specific integrated circuits (ASICs) specified for respectively corresponding operations and functions (e.g., the processors and/or ASICs is configured to control the communication module to transmit and/or receive data signals for the image data and control signals for the image data) described herein in the present disclosure.

The image stabilizing apparatus 100 according to some embodiments is configured as a form of server device (hereinafter, referred to as "server") or the like. Therefore, each constituent element of the image stabilizing apparatus 100 is conceptually separated in order to differentiate a logical function of the server, but is not separated physically. The image stabilizing apparatus 100 receives image data from the camera 300 in order to correct a blur of an image. Herein, the image captured by one or more cameras 300 is composed of at least one frame (or picture frame).

The image stabilizing apparatus 100 receives images recorded by a plurality of cameras 300, and divides a frame in each received image into one or more blocks. The image stabilizing apparatus 100 extracts a feature point of an object in each block, and calculates a global motion vector of the image based on the calculation of local motion vectors of a block corresponding to the feature point, thus correcting a blurry image and outputting a corrected image. The image stabilizing apparatus 100 is not limited to its literal meaning. The image stabilizing apparatus 100 is embodied in a mobile terminal device (hereinafter, referred to as "mobile terminal") including one or more processors and/or application-specific integrated circuits (ASICs) specified for respectively corresponding operations and functions configured to correct the blur of the image described herein in the present disclosure. The mobile terminal includes an image correction application software installed in the processors and/or the ASICs therein to perform correction of the blur of the image. As an exemplary embodiment of the present disclosure, the mobile terminal runs the image correction application by an operation or an instruction of the user, and corrects the blurry image by using the image correction application. When the mobile terminal is a smartphone, the image correction application is installed in the mobile terminal by being downloaded from an application market. When the mobile terminal is a feature phone, the image correction application is run on a virtual machine (VM) downloaded from a communication provider server. The image correction application can be embedded in the mobile terminal, embedded in an operating system (OS) of the mobile terminal, or installed on the OS of the mobile terminal by an operation or an instruction of the user. The image correction application installed in the mobile terminal in the above-mentioned manner is run interoperably with basic application software (e.g., texting application, data communication application, messenger application, phone application, radio application, DMB application, navigation application, etc.) installed in the mobile terminal, although it is not limited to this scheme, but can be run independently regardless of the basic applications.

Figure 2:
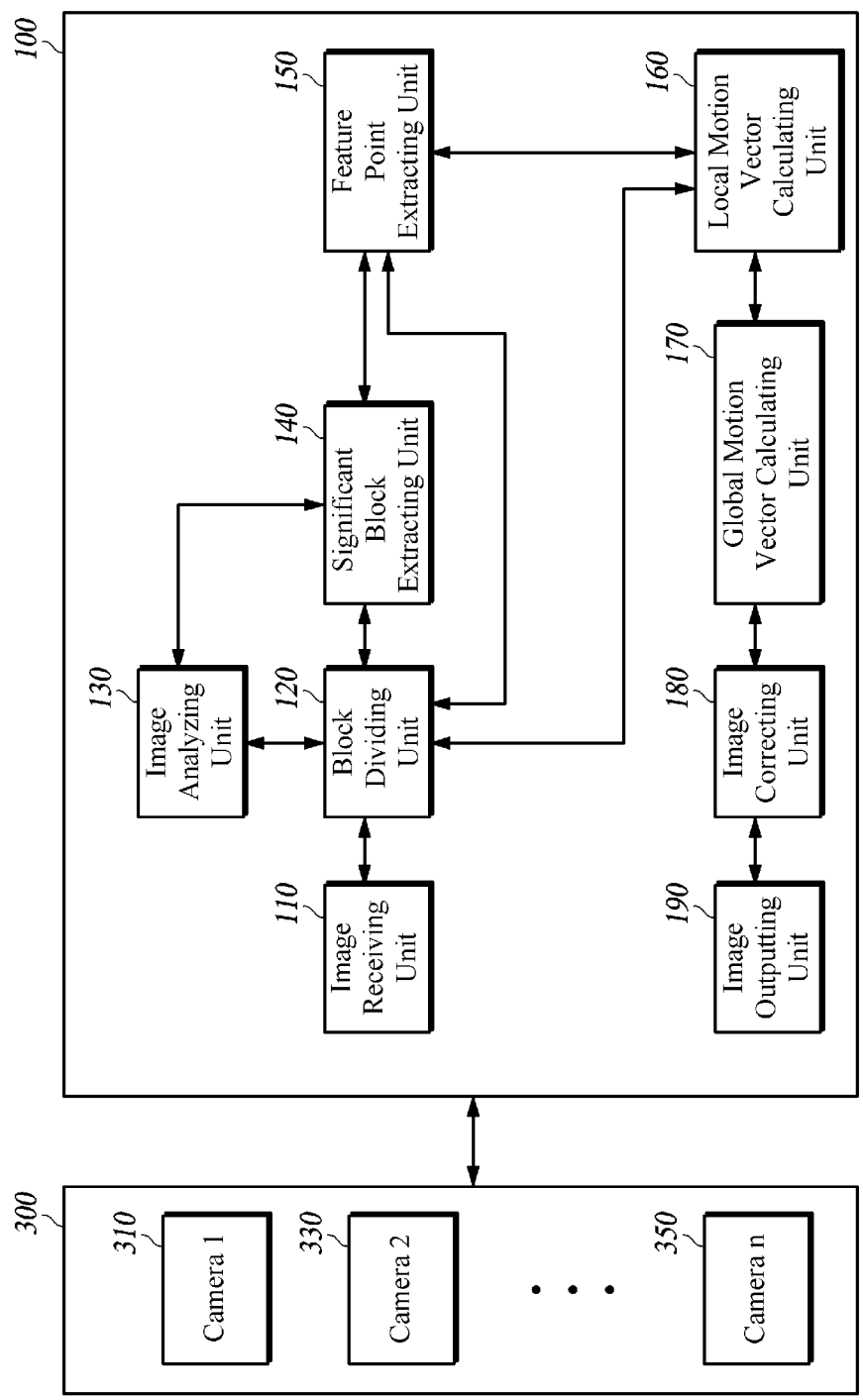
FIG. 2 is a block diagram of the image stabilizing apparatus according to some embodiments of the present disclosure.

FIG. 2 is a block diagram of the image stabilizing apparatus 100 according to some embodiments of the present disclosure.

Referring to FIG. 2, the image stabilizing apparatus 100 includes an image receiving unit 110, a block dividing unit 120, an image analyzing unit 130, a significant block extracting unit 140, a feature point extracting unit 150, a local motion vector calculating unit 160, a global motion vector calculating unit 170, an image correcting unit 180 and an image outputting unit 190. Each of the image receiving unit 110, the block dividing unit 120, the image analyzing unit 130, the significant block extracting unit 140, the feature point extracting unit 150, the local motion vector calculating unit 160, the global motion vector calculating unit 170, the image correcting unit 180 and the image outputting unit 190 is implemented by, or includes, one or more processors and/or application-specific integrated circuits (ASICs) specified for respectively corresponding operations and functions described herein in the present disclosure. The image stabilizing apparatus 100 further includes the communication module (or the communication modem) (not shown in FIG. 2) to transmit and/or received signals for image data to and/or from the camera 300 (i.e., exchange image data with the camera 300) in order to correct a blur of an image.

The camera 300 connected to the image stabilizing apparatus 100 is a device for capturing or recording an image. The camera 300 includes a CCTV camera for recording an object image to monitor move, entry, and leave of an object, a surveillance camera, a camera mounted on a smartphone as a mobile terminal, and the like. An image recorded by the camera 300 includes a plurality of frames.

It is described that the camera 300 connected to the image stabilizing apparatus 100 exchanges signals for images and data with the image stabilizing apparatus 100 via the network 500; however, the present disclosure is not limited to this scheme. The camera 300 exchanges signals for the image and the data with the image stabilizing apparatus 100 via any form of various networks, not being limited to its literal meaning, such as a short-distance communication network or a communication network established by communication base stations installed by a predetermined company, so long as signals for the image and the data are transmitted to, and received from, the image stabilizing apparatus 100.

The image receiving unit 110 of the image stabilizing apparatus 100 is connected to the camera 300, and receives an image recorded by the camera 300. The image receiving unit 110 is builed in, and an element of, the communication module of the image stabilizing apparatus 100. The image refers to a recorded image from each of a plurality of cameras grouped into the camera 300, and the recorded image includes a plurality of frames.

Figure 5A:
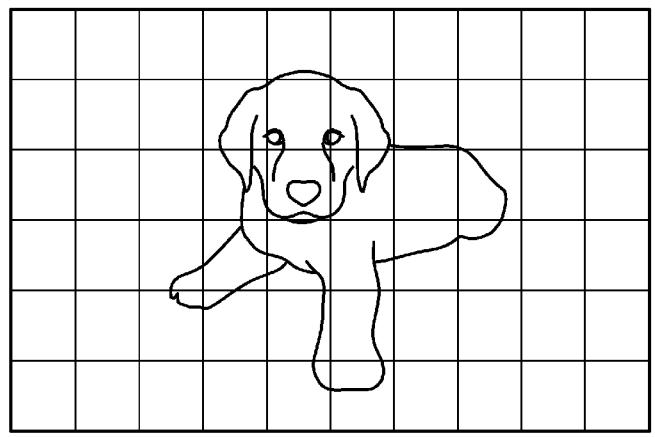
FIGS. 5A and 5B are a schematic diagram of a process of dividing a frame of an image into blocks in the image stabilizing apparatus according to some embodiments of the present disclosure.
Figure 5B:
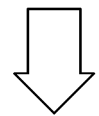
Figure 5B:
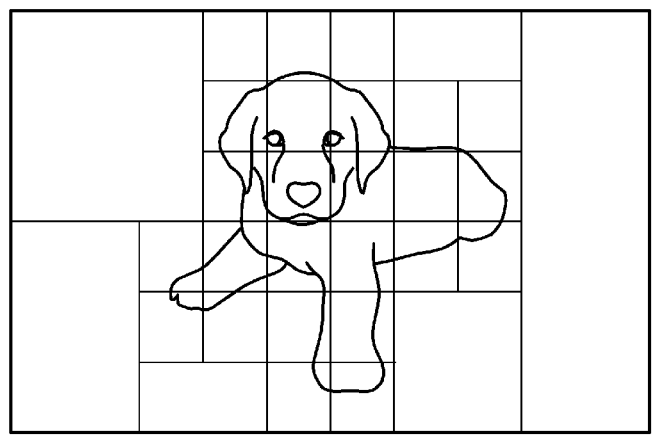

The block dividing unit 120 divides a frame in the received image, recorded and transmitted by the camera, into at least two blocks. The block dividing unit 120 divides the frame into unit blocks, the unit block having a predetermined width and height (i.e., a block of N×N size) in size, and combines (or merges) blocks having similar object distributions based on a density of edges and histogram distribution characteristics in a block. Thereby the frame is divided into several blocks having different sizes. For example, an area from which the feature point is hard to extract, such as an area (e.g., a background area) corresponding to a sky and a desert in the frame, is divided into one or more large blocks, and an area including an object such as human, thing, or the like in the frame is divided into one or more small or medium blocks depending on the object size occupied in the frame. As a result of dividing the frame to one or more block respectively consider a size and an area of the object and a size and an area of the background in the frame, the divided frame of the image comprises, for example, one or more small or medium blocks corresponding to the object, and one or more large blocks corresponding to the background in the frame, as shown in FIGS. 5A and 5B.

The image analyzing unit 130 calculates a weight of each of the blocks by analyzing characteristics of the blocks divided by the block dividing unit 120. The calculation of the weight includes calculating the weight of each of the blocks according to an object distribution calculated based on the density of edges and histogram distribution characteristics of each of the blocks. Namely, the blocks are given different weight depending on the respective object distributions. For example, in the calculation of the weight, when the density of edges in each of the blocks is lower than a predetermined threshold value or the histogram distribution is biased to one side, the image analyzing unit 130 determines that the corresponding area is not a block to extract a feature point, and the weight of the block corresponding to the area is calculated to set a value smaller than the predetermined threshold value. For another example, in the calculation of the weight, when the density of edges in each of the blocks is higher than a predetermined threshold value or the histogram distribution is even, the image analyzing unit 130 determines that the corresponding area is a block to extract a feature point, and the weight of the block corresponding to the area is calculated to set a value higher than the predetermined threshold value. In this regard, the image analyzing unit 130 respectively calculates the corresponding weights of all the divided blocks by calculating an object distribution for each block based on the density of edges and histogram distribution characteristics of each block.

Based on the weight of each block received from the image analyzing unit 130, the significant block extracting unit 140 extracts at least one block having the weight equal to or larger than a predetermined threshold value, as a significant block from among the blocks divided by the block dividing unit 120. The significant block extracting unit 140 extracts (or selects or determines), among the divided blocks, a block as the significant block for having the weight equal to or larger than the predetermined threshold value based on the object distribution depending on the density of edges and the histogram distribution characteristics.

The feature point extracting unit 150 extracts feature points of an object in the frame from the blocks occupied in the object, where the blocks are determined to be the significant block extracted by the significant block extracting unit 140. The feature point extracting unit 150 extracts pixels of each of the blocks, compares at least one of color and brightness of the extracted pixels with those of neighboring pixels, and finally extracts the feature point of each block based on a result of the comparison. For example, when color of the extracted pixel is quite different from that of neighboring pixels, the extracted pixel is extracted as feature point of corresponding block.

The local motion vector calculating unit 160 calculates a local motion vector by referring a previous frame of the frame and estimating a motion of at least one block among the blocks corresponding to the feature points extracted by the feature point extracting unit 150.

The global motion vector calculating unit 170 calculates a global motion vector based on at least one of the local motion vectors calculated for said at least one block. The global motion vector is calculated by applying the weight to each of the local motion vectors and averaging the weighted local motion vectors. When the global motion vector calculating unit 170 determines that a motion of the feature point is constant by referring to a plurality of calculated local motion vectors of a plurality of frames of the image, the global motion vector calculating unit 170 determines that the local motion vectors of the feature points correspond to a normal moving object, and omits generation of the global motion vector. When at least one of magnitude or direction of at least one local motion vector is out of a predetermined threshold value range, the global motion vector calculating unit 170 omits a generation of the global motion vector of the local motion vector(s).

The image correcting unit 180 corrects a blur of the frame based on the global motion vector calculated by the global motion vector calculating unit 170.

The image outputting unit 190 outputs image data corrected by the image correcting unit 180 on a screen.

Figure 3:
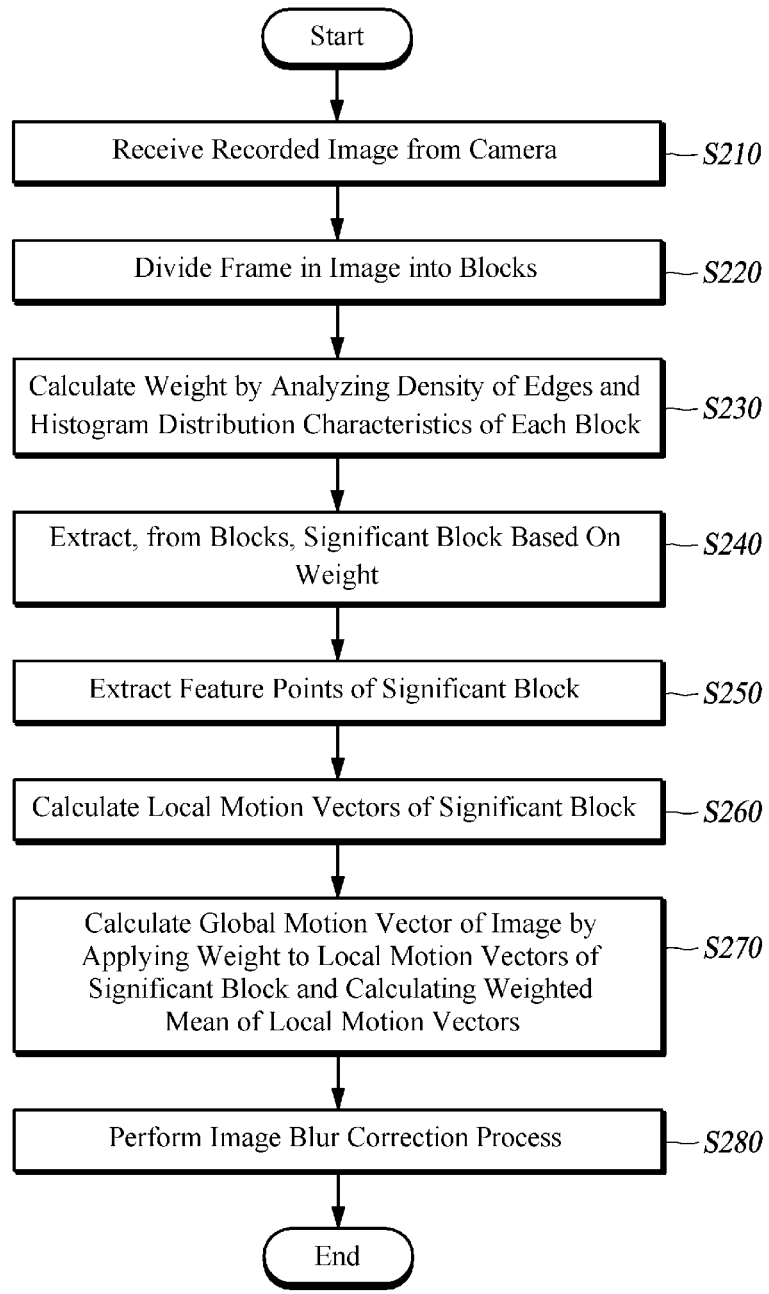
FIG. 3 is a flowchart of a process of dividing an image into blocks, extracting a feature point, and calculating a motion vector in the image stabilizing apparatus according to some embodiments of the present disclosure.

FIG. 3 is a flowchart of a process of dividing an image into blocks, extracting a feature point, and calculating a motion vector in the image stabilizing apparatus according to some embodiments of the present disclosure. Details of a method for stabilizing an image according to some embodiments are described below with respect to FIG. 3.

Upon receiving an image recorded by the camera 300 (Step S210), the image stabilizing apparatus 100 according to some embodiments of the present disclosure divides a frame of the image into blocks in order to correct a blur of the frame in the image captured and transmitted by the camera 300 (Step S220).

The image stabilizing apparatus 100 calculates the weight of each of the blocks by analyzing the density of edges of each of the blocks and the histogram distribution characteristics of each of the blocks (Step S230), and extracts (or selects or determines) at least one significant block (i.e., significant block (s)) from among the blocks based on the weights of the blocks (Step S240). The image stabilizing apparatus 100 extracts, from among the divided blocks, a block as the significant block for having the weight equal to or larger than the predetermined threshold value based on the object distribution depending on the block edge density and the histogram distribution characteristics.

The image stabilizing apparatus 100 extracts feature points of the significant blocks (Step S250), and calculates the local motion vectors of the significant blocks (Step S260). The image stabilizing apparatus 100 then calculates the global motion vector corresponding to the entire image by applying the weight to the local motion vectors of the significant blocks and calculating a weighted mean (average) of the local motion vectors (Step S270).

The image stabilizing apparatus 100 enables the image correcting unit 180 to correct the blur of the image by using the global motion vector (Step S280).

Figure 4:
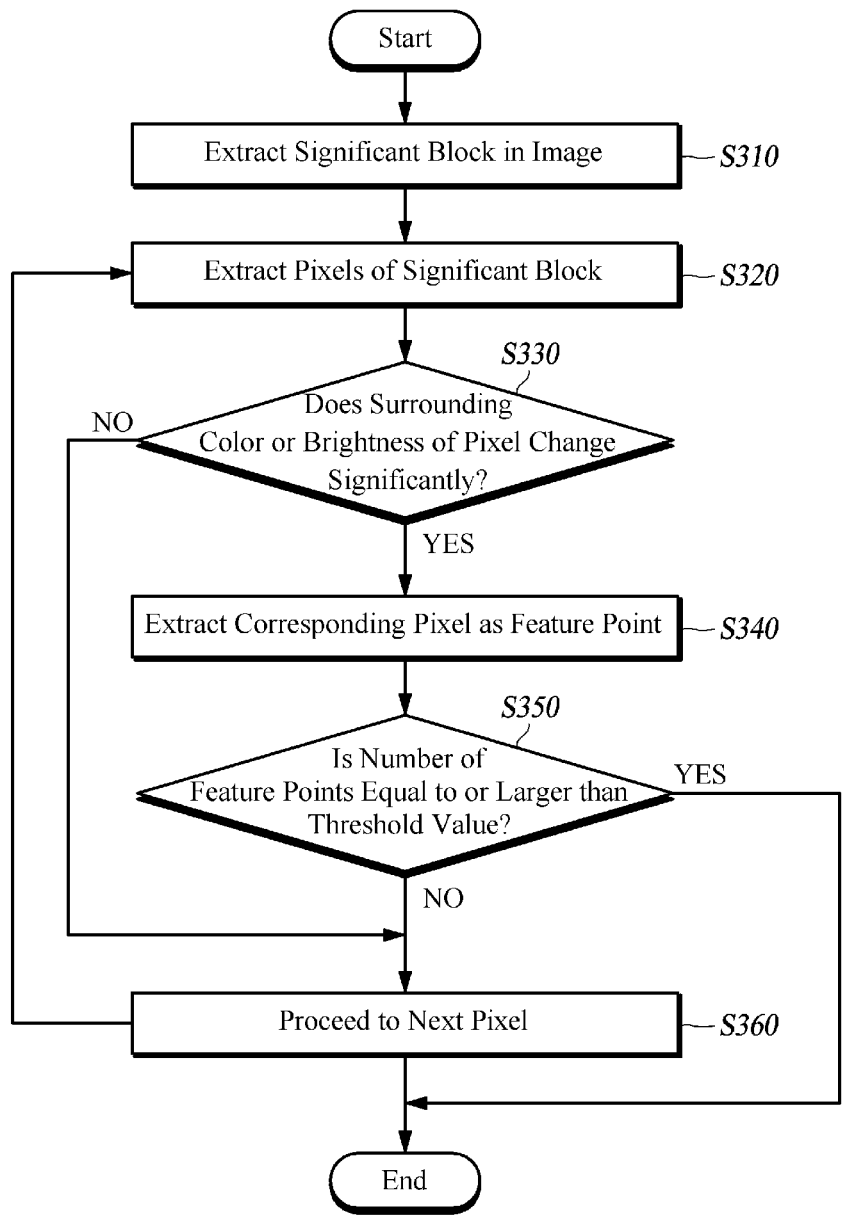
FIG. 4 is a flowchart of a process of extracting a feature point from a significant block of an image in the image stabilizing apparatus according to some embodiments of the present disclosure.

FIG. 4 is a flowchart of a process of extracting a feature point from a significant block of an image in the image stabilizing apparatus according to some embodiments of the present disclosure.

The image stabilizing apparatus 100 extracts the significant block(s) in the image (Step S310), and extracts the pixels of the significant block(s) (Step S320). The image stabilizing apparatus 100 extracts, as the significant block(s) from among the divided blocks, a block having the weight equal to or larger than the predetermined threshold value based on the object distribution depending on the block edge density and the histogram distribution characteristics, and extracts the pixels of the significant block(s).

The image stabilizing apparatus 100 compares at least one of color and brightness of the extracted pixels with those of neighboring pixels and determines whether or not the color or the brightness of a pixel changes more than a predetermined threshold value from those of neighboring pixels (Step S330). When it is determined that the surrounding color or the brightness of the pixel changes more than a predetermined threshold value, the image stabilizing apparatus 100 extracts the pixel as the feature point (Step S340). If not, the image stabilizing apparatus 100 proceeds to the next pixel to continue the pixel extracting process.

The image stabilizing apparatus 100 determines whether or not the number of extracted feature points is equal to or larger than a predetermined threshold value (Step S350), when it is below the predetermined threshold, proceeds to the next pixel (Step S360), and when it is determined that the number of feature points is equal to or larger than the predetermined threshold value, the image stabilizing apparatus 100 extracts the feature points by ending the process.

FIGS. 5A and 5B are a schematic diagram of a process of dividing a frame of an image into blocks in the image stabilizing apparatus according to some embodiments of the present disclosure.

In FIG. 5A, the image stabilizing apparatus 100 divides a frame in an image into unit blocks of a predetermined width and height (e.g., N×N). In FIG. 5A, an exemplary frame of an imaged captured by the camera 300 is divided into N×N unit blocks. A captured object (i.e., a dog) is centered, and occupies one or more blocks among the divided blocks, in the frame. And in FIG. 5B, the image stabilizing apparatus 100 merges blocks with similar object distributions through an analysis of the object distribution. Finally, the frame is divided into several blocks having different sizes. As shown in FIG. 5B, merging blocks is blocks mainly corresponding to a background area. Significant blocks are some or all of blocks occupied by the captured object. Feature points of are extracted from the significant blocks, i.e., blocks occupied by the captured object.

In describing some embodiments of the present disclosure, as briefly described earlier, each constituent element of the image stabilizing apparatus 100 according to some embodiments of the present disclosure is a logically separated element, rather than a physically separated element.

Serving as logical constituent elements to realize the technical idea of some embodiments of the present disclosure, the respective components should be construed to be within the scope of the claimed invention even if some of the components are combined or separated to perform their respective functions so long as the functions of the logical configuration of the embodiments can be achieved. The respective components should be construed to be within the scope of the claimed invention provided that the components, regardless of whether they are literally identical or not, perform the same or similar function.

According to some embodiments of the present disclosure as described above, an effective image compensating method is provided in the image correction field, by determining and correcting a blurry portion of a recorded image in an accurate manner.

According to some embodiments of the present disclosure, the efficiency of correcting an image is increased such that the time for correcting the image is decreased by estimating a local motion vector for each block considering the image characteristics and object distribution and not using all pixel values of the entire image.

According to some embodiments of the present disclosure, a recorded image that is required by a user can be corrected by the minimum data process by estimating the local motion vector by dividing the image into blocks.

According to some embodiments of the present disclosure, an image stabilizing apparatus implements the kind of process centered on user convenience and accessibility for achieving image corrections and in turn stable images for rapid reproduction with a broad applicability in the fields of image correction and image stabilization.

Some embodiments of the present disclosure provide increased user accessibility and convenience with efficiency in image corrections leading to an infrastructure for building a new service model in the field of image correction thus obtaining an economic effect by way of creation of new contents and new demand.

In the description above, although all of the components of the embodiments of the present disclosure have been explained as assembled or operatively connected as a unit, the present disclosure is not intended to limit itself to such embodiments. Rather, within the objective scope of the claimed invention, the respective components is able to be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program is easily deduced by a person skilled in the art. The computer program may be stored in non-transitory computer readable recording medium, which in operation can realize some embodiments of the present disclosure. Examples of the non-transitory computer readable recording medium include magnetic recording media, such as a hard disk, a floppy disk, and a magnetic tape, and optical recording media, such as a compact disk read only memory (CD-ROM) and a digital video disk (DVD), magneto-optical media, such as a floptical disk, and hardware devices that are specially configured to store and execute program instructions, such as a ROM, a random access memory (RAM), and a flash memory.

Although exemplary embodiments of the present disclosure have been described for illustrative purposes, those skilled in the art will appreciate that various modifications, additions and substitutions are possible, without departing from the scope and spirit of the claimed invention as disclosed in the accompanying claims.

Therefore, exemplary embodiments of the present disclosure have been described for the sake of brevity and clarity, and the explicitly described embodiments as above are not intended to limit the scope of the claimed invention.

The scope of the claimed invention is to be determined by not only the following claims but also their equivalents. Specific terms used in this disclosure and drawings are used for illustrative purposes and not to be considered as limitations of the present disclosure. Therefore, the scope of the claimed invention is construed as defined in the following claims and changes, modifications and equivalents that fall within the technical idea of the present disclosure are intended to be embraced by the claimed invention.

The invention claimed is:

1. An apparatus for stabilizing an image based on a correction of a blur of the image, the apparatus comprising:
   an image receiving unit, implemented by one or more processors, configured to receive the image;
   a block dividing unit, implemented by one or more processors, configured to divide a frame of the image into blocks, and merge the blocks having similar object distributions based on a density of edges and histogram distribution characteristics in each of the blocks;
   an image analyzing unit, implemented by one or more processors, configured to analyze characteristics of each block to calculate a weight of each block by calculating an object distribution based on the density of edges and histogram distribution characteristics of each of the blocks;
   a significant block extracting unit, implemented by one or more processors, configured to
      extract, from the blocks, a block having a weight equal to or larger than a threshold value,
      determine the extracted block to be a significant block;
   a feature point extracting unit, implemented by one or more processors, configured to
      extract pixels from the significant block, and
      extract a feature point of an object in the significant block by comparing at least one of color and brightness between the extracted pixels and neighboring pixels of the extracted pixels, wherein the feature point indicates a pixel corresponding to a part of the object in the image;
   a local motion vector calculating unit, implemented by one or more processors, configured to calculate at least one local motion vector of at least one block corresponding to the feature point by referring a previous frame of the frame and estimating a motion of the at least one block;
   a global motion vector calculating unit, implemented by one or more processors, configured to calculate a global motion vector based on the calculated at least one local motion vector of the at least one block; and
   an image correcting unit, implemented by one or more processors, configured to correct output data of the frame based on the global motion vector.

2. The apparatus according to claim 1, wherein the global motion vector calculating unit is configured to calculate the global motion vector based on an application of the weight to the at least one local motion vector and a weighted mean of the at least one local motion vector.

3. The apparatus according to claim 1, wherein
   the block dividing unit is configured to divide the frame into unit blocks, merge the unit blocks having similar object distributions depending on a density of edges and histogram distribution characteristics received from the image analyzing unit and to thereby divide the frame into several blocks having different sizes, and
   the significant block extracting unit is configured to extract the at least one blocks among the several blocks as the significant block.

4. The apparatus according to claim 1, wherein the local motion vector calculating unit is configured to calculate local motion vectors of a plurality of frames with respect to the feature point.

5. The apparatus according to claim 4, wherein when a motion of the feature point is determined to be constant by referring to a plurality of calculated local motion vectors of the plurality of frames, the global motion vector calculating unit is configured to determine that the local motion vectors with respect to the feature point represent a normal moving object, and omits a generation of the global motion vector.

6. The apparatus according to claim 1, wherein when at least one of a magnitude and a direction of the at least one local motion vector is out of a predetermined threshold value range, the global motion vector calculating unit is configured to omit a generation of the global motion vector of the at least one local motion vector.

7. The apparatus according to claim 1, wherein
   an image analyzing unit configured to generate an object distribution based on a density of edges and histogram distribution characteristics of each block, and allow the block dividing unit to merge the blocks having similar object distributions depending on the object distribution.

8. A non-transitory computer-readable recording medium containing a program including computer-executable instructions for stabilizing an image based on a correction of a blur of the image, the program, when executed by a processor, causing the processor to execute:
   receiving the image;
   dividing a frame of the image into blocks, and merge the blocks having similar object distributions based on a density of edges and histogram distribution characteristics in each of the blocks;
   performing a first feature point extraction, comprising:
      extracting pixels of the blocks, and
      extracting a feature point of an object based on a result of comparing at least one of color and brightness between the extracted pixels and neighboring pixels of the extracted pixels, wherein the feature point indicates a pixel corresponding to a part of the object in the image;

calculating at least one local motion vector of at least one block corresponding to the feature point by referring a previous frame of the frame and estimating a motion of the at least one block;

calculating a global motion vector based on at least one calculated local motion vector of the at least one block; and correcting output data of the frame based on the global motion vector.

9. The non-transitory computer-readable recording medium according to claim 8, further comprising:

analyzing characteristics of each block to calculate a weight of each block;

performing a second feature point extraction comprising:
extracting a block having a weight equal to or larger than a threshold value as a significant block, and
extracting the feature point from the significant block.

10. A method for stabilizing an image based on a correction of a blur of the image, the method comprising:

receiving the image;

dividing a frame of the image into blocks, and merge the blocks having similar object distributions based on a density of edges and histogram distribution characteristics in each of the blocks;

analyzing characteristics of each block to calculate a weight of each block by calculating an object distribution based on the density of edges and histogram distribution characteristics of each of the blocks;

first extracting including extracting a block having a weight equal to or larger than a threshold value and determining the extracted block to be a significant block;

extracting pixels from the significant block, and extracting a feature point of an object in the significant block by comparing at least one of color and brightness between the extracted pixels and neighboring pixels of the extracted pixels, wherein the feature point indicates a pixel corresponding to a part of the object in the image;

calculating at least one local motion vector of at least one block corresponding to the feature point by referring a previous frame of the frame and estimating a motion of the at least one block;

calculating a global motion vector based on at least one calculated local motion vector of the at least one block; and correcting output data of the frame based on the global motion vector.

11. The method according to claim 10, further comprising:

performing an image analysis by
generating an object distribution based on a density of edges and histogram distribution characteristics of each block, and
allowing the performing of the block division to merge the blocks having similar object distributions depending on the object distribution.

12. The method according to claim 10, wherein the global motion vector is calculated based on an application of the weight to the at least one local motion vector and a weighted mean of the at least one local motion vector.

13. The method according to claim 10, further comprising:

receiving a density of edges and histogram distribution characteristics;

merging the blocks having similar object distributions depending on the density of edges and the histogram distribution characteristics; and extracting at least one blocks among the several blocks as the significant block.

14. The method according to claim 10, further comprising:

calculating local motion vectors of a plurality of frames with respect to the feature point.

15. The method according to claim 14, further comprising:

when a motion of the feature point is determined to be constant by referring to a plurality of calculated local motion vectors of the plurality of frames, determining that the local motion vectors with respect to the feature point represent a normal moving object; and omitting a generation of the global motion vector.

16. The method according to claim 10, further comprising:

when at least one of a magnitude and a direction of the at least one local motion vector is out of a predetermined threshold value range, omitting a generation of the global motion vector of the at least one local motion vector.

* * * * *